United States Patent
zur Loye et al.

(10) Patent No.: US 10,145,317 B2
(45) Date of Patent: Dec. 4, 2018

(54) SYSTEM AND METHOD FOR DUAL FUEL ENGINES

(71) Applicant: Cummins IP, Inc., Columbus, IN (US)

(72) Inventors: Axel O. zur Loye, Columbus, IN (US); David J. Reynolds, Memphis, IN (US)

(73) Assignee: Cummins IP, Inc., Columbus, IN (US)

( * ) Notice: Subject to any disclaimer, the term of this patent is extended or adjusted under 35 U.S.C. 154(b) by 554 days.

(21) Appl. No.: 14/770,293

(22) PCT Filed: Feb. 18, 2014

(86) PCT No.: PCT/US2014/016785
§ 371 (c)(1),
(2) Date: Aug. 25, 2015

(87) PCT Pub. No.: WO2014/133819
PCT Pub. Date: Sep. 4, 2014

(65) Prior Publication Data
US 2016/0003170 A1    Jan. 7, 2016

Related U.S. Application Data

(60) Provisional application No. 61/769,637, filed on Feb. 26, 2013.

(51) Int. Cl.
*F02D 19/08*    (2006.01)
*F02D 41/00*    (2006.01)
(Continued)

(52) U.S. Cl.
CPC ....... *F02D 19/081* (2013.01); *F02D 19/0647* (2013.01); *F02D 41/0025* (2013.01);
(Continued)

(58) Field of Classification Search
CPC ............... F02D 19/081; F02D 19/0647; F02D 19/0602; F02D 41/0025; F02D 41/0027;
(Continued)

(56) References Cited

U.S. PATENT DOCUMENTS 6,173,570 B1 *   1/2001   Mitsumoto ........... F01N 3/0842
                                                                                                 60/285
6,561,157 B2    5/2003   Zur Loye et al.
(Continued)

OTHER PUBLICATIONS

International Search Report and Written Opinion for International Application No. PCT/US2014/016785, dated Jun. 3, 2014, 8 pages.

*Primary Examiner* — Grant Moubry
(74) *Attorney, Agent, or Firm* — Foley & Lardner LLP

(57) ABSTRACT

Disclosed herein is a system for managing combustion in an internal combustion engine includes a detection module that determines a combustion condition of the internal combustion engine. The combustion condition includes one of a first combustion condition or second combustion engine. The system also includes a fuel table module that receives the combustion condition and selects an engine operating request based on data in a first fuel table when the combustion condition is the first combustion condition, and data in a second fuel table when the combustion condition is the second combustion condition. The system additionally includes an engine control module that receives the engine operating request and generates engine operating commands based on the engine operating request.

20 Claims, 6 Drawing Sheets

(51) Int. Cl.
  *F02D 19/06*   (2006.01)
  *F02D 41/24*   (2006.01)
(52) U.S. Cl.
  CPC ...... *F02D 41/0027* (2013.01); *F02D 41/2422* (2013.01); *Y02T 10/36* (2013.01)
(58) Field of Classification Search
  CPC .......... F02D 41/2422; F02B 7/00; F02B 7/08; F02M 21/00; F02M 21/02
  See application file for complete search history.

(56) References Cited

U.S. PATENT DOCUMENTS

| | | | |
|---|---|---|---|
| 6,598,584 B2 | 7/2003 | Beck et al. | |
| 7,093,588 B2 * | 8/2006 | Edwards | F02D 19/0631 123/525 |
| 7,270,089 B2 | 9/2007 | Wong | |
| 7,393,305 B2 * | 7/2008 | Yamada | B60W 10/06 477/110 |
| 7,463,967 B2 * | 12/2008 | Ancimer | F02D 19/10 123/480 |
| 7,913,673 B2 | 3/2011 | Vanderslice et al. | |
| 2003/0187565 A1 | 10/2003 | Wong | |
| 2005/0121005 A1 | 6/2005 | Edwards | |
| 2007/0295316 A1 | 12/2007 | Davis et al. | |
| 2010/0332106 A1 | 12/2010 | Vanderslice et al. | |
| 2011/0288738 A1 | 11/2011 | Donnelly et al. | |
| 2011/0288751 A1 | 11/2011 | Kurtz | |
| 2012/0055457 A1 | 3/2012 | Wong et al. | |
| 2012/0240670 A1 * | 9/2012 | Takashima | F02D 41/2467 73/114.49 |
| 2012/0266846 A1 | 10/2012 | Kilbourne | |
| 2013/0218440 A1 * | 8/2013 | Styron | F02D 41/3017 701/105 |

\* cited by examiner

SYSTEM AND METHOD FOR DUAL FUEL ENGINES

CROSS-REFERENCE TO RELATED APPLICATION

This application claims the benefit of U.S. Provisional Patent Application No. 61/769,637, filed Feb. 26, 2013, entitled "SYSTEM AND METHOD FOR DUAL FUEL ENGINES," which is incorporated herein by reference in its entirety.

FIELD

The present disclosure relates to internal combustion engines, and more particularly relates to controlling internal combustion engines powered by dual fuels.

BACKGROUND

Internal combustion engines are found in different applications and are used for many different purposes. For example, automobiles, lawnmowers, trains, pumps, and generators use some form of an internal combustion engine. The vast majority of these engines are configured to operate with a single fuel type, for example, diesel fuel. Because only a single fuel type is used in most internal combustion engines, the kinetics of the combustion reaction can be anticipated and governed by a conventional electronic control module ("ECM").

However, in some engines (e.g., conventional dual fuel engines) a second type of fuel can be introduced to supplement or partially take the place of the first fuel in the combustion chamber. The selection of the second fuel often depends on the energy density of the fuels and/or the cost disparity between the two fuels. For example, because natural gas is generally less expensive per unit of energy than diesel fuel, some dual fuel engines have incorporated a natural gas delivery point in the air intake of the engine while still injecting liquid diesel fuel directly into the combustion chamber. The volume of natural gas delivered can range from a small percentage of the total fuel (for facilitating ignition) all the way up to a substantial percentage of the total fuel.

In many dual fuel systems, the internal combustion engine is physically retro-fitted to enable the engine to operate with two different types of fuels. However, no modifications or adjustments are made to the conventional ECM, which is responsible for governing the operation and performance of the engine. In other words, conventional dual fuel systems merely allow two fuels to be injected into the combustion chamber but fail to provide the proper governing and control structure that is desirable when dealing with the reaction kinetics of two different fuels in a single combustion chamber. Accordingly, conventional dual fuel engines often suffer from a variety of problems, including excessive engine knock, poor fuel economy (partially as a result of the ECM causing the engine to over-compensate), excessively high engine temperatures, and harmful emissions, to name a few. These problems can severely limit the amount of secondary fuel that can be substituted for the primary fuel, thus reducing the effectiveness of conventional dual fuel engines.

SUMMARY

The subject matter of the present application has been developed in response to the present state of the art, and in particular, in response to the problems and needs in dual fuel powered internal combustion engine systems that have not yet been fully solved by currently available systems. Accordingly, the subject matter of the present application has been developed to provide an apparatus, system, and method for controlling the operation of a dual fuel powered internal combustion engine that overcomes at least some shortcomings of the prior art approaches.

According to one embodiment, a system for managing combustion in an internal combustion engine includes a detection module that determines a combustion condition of the internal combustion engine. The combustion condition includes one of a first combustion condition or second combustion condition. The system also includes a fuel table module that receives the combustion condition and selects an engine operating request based on data in a first fuel table when the combustion condition is the first combustion condition, and data in a second fuel table when the combustion condition is the second combustion condition. The system additionally includes an engine control module that receives the engine operating request and generates engine operating commands based on the engine operating request.

In some implementations of the system, the first combustion condition includes combustion of only a first fuel, and the second combustion condition includes combustion of a combination of the first fuel and a second fuel. The first fuel can be a liquid fuel and the second fuel can be a gaseous fuel. The second combustion condition can include a substitution rate of the second fuel. The second fuel table can be one of a plurality of second fuel tables each associated with a different desired substitution rate of the second fuel.

According to certain implementations of the system, the combustion condition includes one of the first combustion condition, the second combustion condition, and a third combustion condition. The fuel table module is further configured to select the engine operating request based on data in a third fuel table when the combustion condition is the third combustion condition. The first combustion condition can be combustion of only a first fuel. The second combustion condition can be combustion of a combination of the first fuel and a second fuel, and the third combustion condition can be combustion of only the second fuel.

In yet certain implementations of the system, the data in the first fuel table includes first predetermined data correlation values based on combustion of only a first fuel by the internal combustion engine, and the data in the second fuel table includes second predetermined data correlation values based on combustion of a combination of the first fuel and a second fuel by the internal combustion engine. The first and second predetermined data correlation values are different. However, in some implementations, the types of data correlations of the first and second predetermined data correlation values are the same.

According to some implementations, the system further includes a powertrain module that receives the engine operating request and adjusts powertrain control elements based on the engine operating request. In yet certain implementations, the detection module collects engine data from sensor elements, and determines the combustion condition of the engine based on the engine data collected from the sensor elements.

In another embodiment, a method for managing combustion in an internal combustion engine includes selecting a combustion operating condition of the internal combustion engine. The combustion operating condition is one of a single fuel mode or a dual fuel mode. The method also includes referencing one of a first fuel table or a second fuel table based on the selected operating condition. The first fuel table is referenced when the selected operating condition is the single fuel mode and the second fuel table is referenced when the selected operating condition is the dual fuel mode. Additionally, the method includes selecting an engine operating request from the referenced first fuel table or second fuel table. The method also includes sending engine operating commands to engine control elements according to the engine operating request.

According to some implementations of the method, each of the first and second fuel tables includes a plurality of predetermined engine operating requests based on current operating conditions of the internal combustion engine. The method may also include collecting engine data from sensor elements, where current operating conditions of the internal combustion engine are based on the collected engine data. Selecting the combustion operation condition of the engine can be based on current operating conditions of the internal combustion engine. In certain implementations, selecting a combustion operation condition of the engine includes detecting the combustion operating condition of the engine.

In yet some implementations, the method includes referencing one of the first fuel table, the second fuel table, or a third fuel table based on the selected operating condition. The single fuel mode includes fueling the internal combustion engine using only one of a first and second fuel, and the dual fuel mode includes fueling the internal combustion engine using a combination of the first and second fuels. The first fuel table is referenced when the selected operating condition is the single fuel mode with the internal combustion engine being fueled by the first fuel only, and the third fuel table is referenced when the selected operating condition is the single fuel mode with the internal combustion engine being fueled by the second fuel only.

According to other implementations of the method, the first fuel table includes first predetermined data correlation values based on combustion of only a first fuel by the internal combustion engine. Further, the second fuel table includes second predetermined data correlation values based on combustion of a combination of the first fuel and a second fuel by the internal combustion engine. The first and second predetermined data correlation values are different. The types of data correlations of the first and second predetermined data correlation values are the same.

In yet another embodiment, a system for managing combustion in an engine includes a detection module that collects engine data from sensor elements and detects a combustion condition of the engine. The combustion condition includes at least a status of whether an engine is combusting a first fuel or a combination of the first fuel and a second fuel. The system includes a fuel table module that receives the combustion condition and selects an engine operating request. The fuel table module includes a first fuel table, where the first fuel table is referenced when the engine is only combusting the first fuel. The fuel table module also includes a dual fuel table, where the dual fuel table is referenced when the engine is combusting the combination of the first fuel and the second fuel. Additionally, the system includes an engine control module that receives the engine operating request and sends out engine operating commands to engine control elements.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
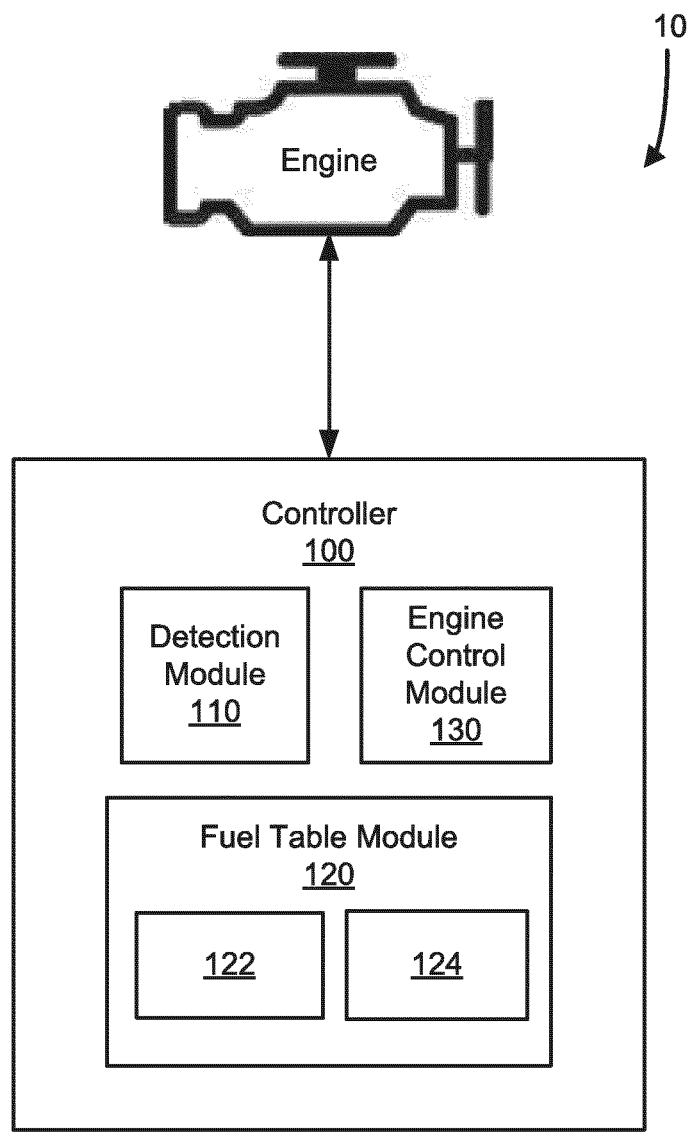
FIG. 1 is a schematic block diagram of a system for controlling a dual fuel engine, according to one representative embodiment.

FIG. 1 is a schematic block diagram of an engine system 10 for controlling a dual fuel engine, according to one representative embodiment. The system 100 includes a controller 100 that has a detection module 110, a fuel table module 120 with a first fuel table 122 and a dual fuel table 124, and an engine control module 130. The detection module 110 is described in greater detail below with reference to FIG. 2, the fuel table module 120 is described below in greater detail with reference to FIG. 3, and the engine control module 130 is described below in greater detail with reference to FIG. 4.

As briefly discussed above in the background section, conventional dual fuel engines fail to properly (e.g., reliably and efficiently) manage the combustion of two fuels in a single combustion chamber. Therefore, the subject matter of the present disclosure relates to a system and method that solve the above mentioned shortcomings in the art. Generally, the present disclosure includes details relating to a control system that incorporates at least a single fuel table and a hybrid ("dual") fuel table. As will be discussed in greater detail below with reference to the fuel table module 120 in FIG. 3, fuel tables (e.g., control surfaces), in one embodiment, are data correlation matrices that include known process variable relationships. In other words, for the purposes of this disclosure, the term "fuel table" refers generally to a process control mechanism/algorithm for correlating measured engine data with demanded/target engine performance. As an example, a fuel table may include torque-to-fuel injection correlations, which compare the torque capable of being produced to the fuel injection characteristics. The fuel injection characteristics may include fuel quantity per injection, injecting timing, and injection strategy (e.g., number and frequency of injection pulses, which can include pilot injections, main injections, post injections, and the like).

Also, for the purposes of this disclosure, the term dual fuel system can refer to a retro-fit implementation on an existing engine or a new-build application. Additionally, it is contemplated that the system 10 can be implemented in various internal combustion engine applications and with various fuel types. For example, a traditionally diesel-only engine used to power a pressure pump in a hydraulic fracturing operation can be retro-fitted to be a diesel-natural gas engine. In another example, an automobile engine can be manufactured to be operable both under gasoline only conditions and in a dual fuel mode using gasoline and diesel fuels. In yet another example, it is contemplated that an engine used for portable power generation can be modified to use both liquid gasoline and hydrogen gas.

Therefore, the present disclosure relates to a system and method that allows an engine to operate in a single fuel mode with single fuel control parameters and also allows an engine to operate in a dual fuel mode with dual fuel control parameters. In other words, a separate set of reaction measurements (for when both fuels are combusting at the same time) are available for use by the ECM in controlling the operation of the engine. Although not depicted in the figures, it is contemplated that the physical modifications to traditional single fuel engines may be implemented in a variety of ways. For example, in one embodiment, an additional fuel injector may be added to the combustion chamber of an engine for injecting the second fuel. In another embodiment (for example when the second fuel is a gas), a delivery port may be added to the air intake of the engine, thus allowing the second fuel to pre-mix with the combustion air before entering the combustion chamber.

Figure 2:
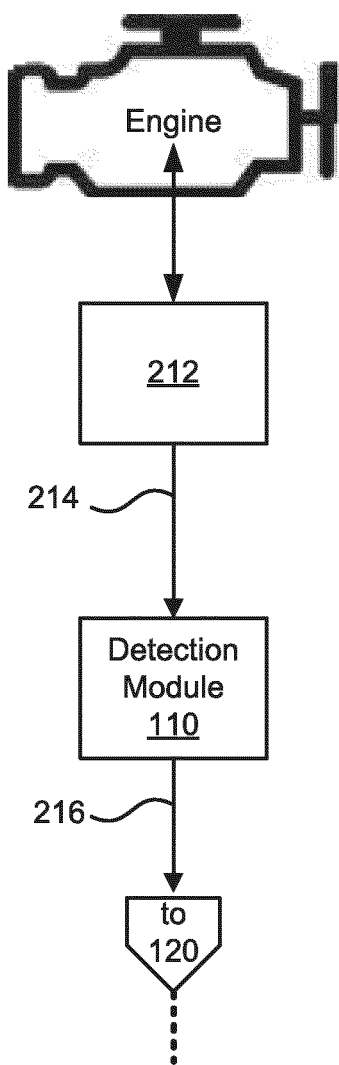
FIG. 2 is a schematic block diagram of a detection module of a system for controlling a dual fuel engine, according to one representative embodiment.

FIG. 2 is a schematic block diagram of a detection module 110 of the controller 10 for controlling a dual fuel engine, according to one representative embodiment. The detection module 110 collects engine data 214 from sensor elements 212 and reports a combustion condition 216 to the fuel table module 120. The combustion condition 216 includes at least the status of the engine as either combusting only the first fuel ("single fuel mode" or "first fuel mode") or combusting the first fuel with the second fuel ("dual fuel mode"). As described below with reference to FIG. 5, it is contemplated that in one embodiment the engine may also combust only the second fuel. The detection module 110 determines the engine's combustion condition 216 by analyzing engine data 214 received from sensor elements 212.

In one embodiment, the sensor elements 212 are continuously collecting data 214 to be analyzed by the detection module 110. In another embodiment, the detection module 110 periodically commands the sensor elements 212 to perform a detecting operation. The command to perform a detecting operation may be triggered by the occurrence of an event, such as the engine reaching a certain temperature or the combustion chamber reaching a certain pressure, or the passage of a certain amount of time.

The data 214 collected and the sensor elements 212 used to collect the data 214 may include a variety of components. For example, a pressure sensor or a temperature sensor may be positioned to measure the pressure and temperature, respectively, within the combustion chamber. In one embodiment, the exhaust/emission properties of the engine may be collected by observing, for example, the pressure difference across an after-treatment component such as a catalytic converter. In another embodiment, more advanced sensor elements 212 may be employed, such as thermal conductivity detectors, flame ionization detectors (gas chromatography), and mass spectrometers, among others. These types of detectors may be used to detect the reactivity, selectivity, and yield of the combustion reaction. The engine data 214 collected by the sensor elements 212 may also include engine speed, torque, horsepower, compressor exit pressure/temperature, fuel injection rate, air-to-fuel ratio, valve positions, and fuel flow rates, among others. It is also contemplated that detection module 110 may simply detect when the ECM commands for the second fuel to be delivered.

The detection module 110 uses the collected engine data 214 to report a combustion condition 216. The combustion condition 216, as briefly discussed above, is a status of the engine at a certain time. Thus, according to one embodiment, the combustion condition 216 may include raw data 214 collected from the sensors 212. In another embodiment, however, the combustion condition 216 includes an interpreted or summarized status of the engine. For example, based on the collected data 214 the detection module 110 may report 216 that the engine is operating lean, that the engine is running at a low (comparatively) temperature, and/or that the engine is in dual fuel mode.

The combustion condition 216 may also include information relating to the substitution rate of the second fuel. For the purposes of this disclosure, the term "substitution rate" refers to the fraction of energy of the second (supplemental) fuel in the combustion chamber over the total energy of the first and second fuels in the combustion chamber. For example, if the combustion condition 216 reported a substitution rate of 25%, one fourth of the total energy within the combustion chamber would be provided by the second fuel. In one embodiment, where diesel is the first fuel and natural gas is the second fuel, the system 10 is able to reliably realize a stable substitution rate in the range of between about 0% and 80%. As will be discussed below with reference to FIG. 5, it is contemplated that in some implementations the substitution rate may range from 0% (only the first fuel) to 100% (only the second fuel). The detection module 110 may also rate certain conditions of the engine as "acceptable" or "requiring attention." For example, if the collected data 214 indicates that the engine is susceptible to knock, which causes the engine to operate inefficiently and may cause damage to the engine, the combustion condition 216 may include a "requiring attention" identifier for the knock rating.

Figure 3:
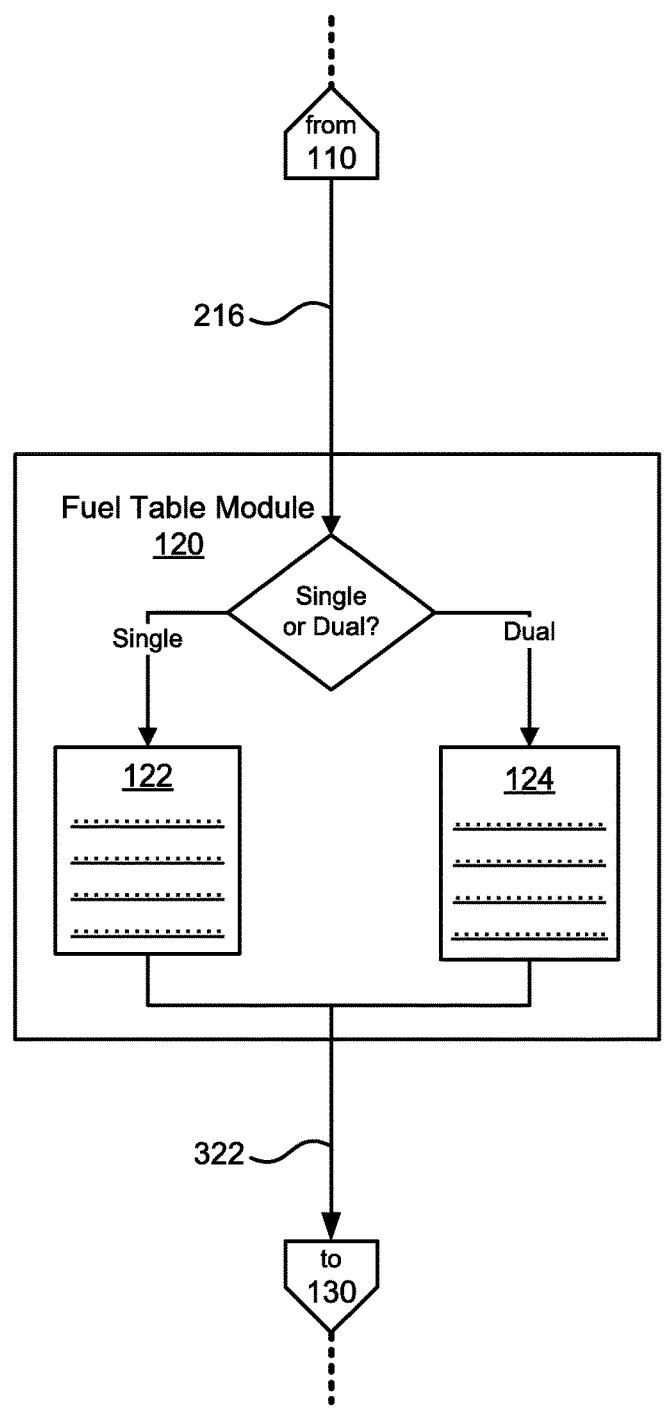
FIG. 3 is a schematic block diagram of a fuel table module of a system for controlling a dual fuel engine, according to one representative embodiment.

FIG. 3 is a schematic block diagram of a fuel table module 120 of the controller 100 for controlling a dual fuel engine, according to one representative embodiment. The fuel table module 120 includes a first fuel table 122 and a dual fuel table 124. The fuel table module 120 receives a combustion condition 216 from the detection module 110 and subsequently selects an engine operating request 322 to send to the engine control module 130. The selection of the engine operating request 322 is based on the information received from the combustion condition 216.

The fuel table module 120, upon receiving the combustion condition 216 of the engine, decides which fuel table 122, 124 to use in selecting the engine operating request 322. For example, if the combustion condition 216 indicates that the engine is operating in dual fuel mode (or the dual fuel mode is selected for operation), the fuel table module 120 will refer to the dual fuel table 124 in selecting an engine operating request 322. Conversely, if the combustion condition 216 indicates that the engine is combusting only the first fuel (or the first fuel mode is selected for operation), the fuel table module 120 will refer to the first fuel table 122 in selecting an engine operating request 322.

The use of the terms first fuel table and dual fuel table does not limit the system 100 to a single table/matrix for each fuel mode. There may be multiple tables for various operating conditions in each mode. Additionally, the combustion reaction kinetics change as the substitution rate changes; therefore the dual table 124 may include multiple sets of tables for certain substitution rates. For example, when the substitution rate is between 25% and 35% the fuel table module 120 may reference one table that results in a certain engine operating request 322 and when the substitution rate is higher than 50%, the fuel table module 120 may reference another table that would result in a different engine operating request.

Once again, the fuel tables 122, 124 may contain various data correlations. For example, the tables 122, 124 may contain, among other correlations, torque-to-fuel injection/ delivery relationships. While the types of correlations may be the same from table 122 to table 124, the values of the relationships are different. In other words, the table 122 is a separate table from 124, and both tables includes data to control the engine independently of each other. Therefore, in one embodiment, the tables associate specific fuel injection/ delivery strategies with expected power generation. The fuel table module 120 therefore converts the engine status information collected by the detection module 110 into an engine operating request 322 to be carried out by the engine control module 130. The fuel table module 120 may also manage optimization. For example, the engine operating request 322 selected from the dual fuel table 124 may be optimized to compromise between substitution rate, emissions reduction performance, and engine performance while still staying within the bounds of the mechanical capability of the engine (such as peak cylinder pressure and knock intensity).

Figure 4:
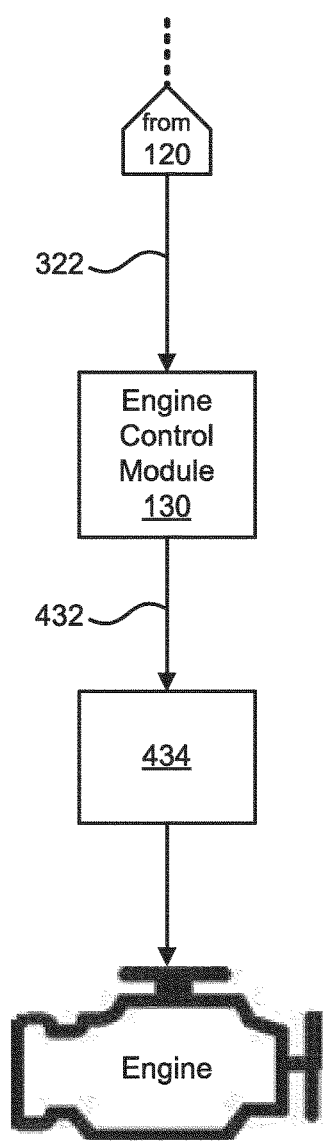
FIG. 4 is a schematic block diagram of an engine control module of a system for controlling a dual fuel engine, according to one representative embodiment.

FIG. 4 is a schematic block diagram of an engine control module 130 of the system 100 for controlling a dual fuel engine, according to one representative embodiment. The engine control module 130 receives the engine operating request 322 from the fuel table module 120 and uses the request 322 to send engine operating commands 432 to engine control elements 434. The engine control elements 434 effectuate the demanded changes to the engine environment. The engine control module 130 may intentionally introduce a delay of a few seconds before switching between dual fuel and single fuel modes in order to ensure the complete consumption of the second fuel.

For example, if the engine operating request 322 called for more fuel to be injected into the combustion chamber, the engine control module 130 could send a command 432 to the engine control elements 434 (e.g., fuel injectors) to increase the flow rate of fuel into the combustion chamber. In another embodiment, the engine control module 130 may alter the timing sequence of the fuel injections and/or may change the injection pressure. In yet another embodiment, the engine control module 130 may also alter the initiation strategy. For example, in spark-ignited engines, the timing or intensity of the spark may be changed in order to facilitate a dual fuel mode. In compression-ignited engines that utilize a pilot ignition charge, the pilot strategy may be altered or turned off altogether, and/or injection timing or pressure may be altered, in order to accommodate the two fuels. In addition to altering injection and initiation strategies, it is also contemplated that the engine control module 130 may change other variables, such as the flow rate, pressure, and temperature of the intake, by adjusting the corresponding control elements 434 (e.g. valves, heat exchangers, compressors).

Figure 5:
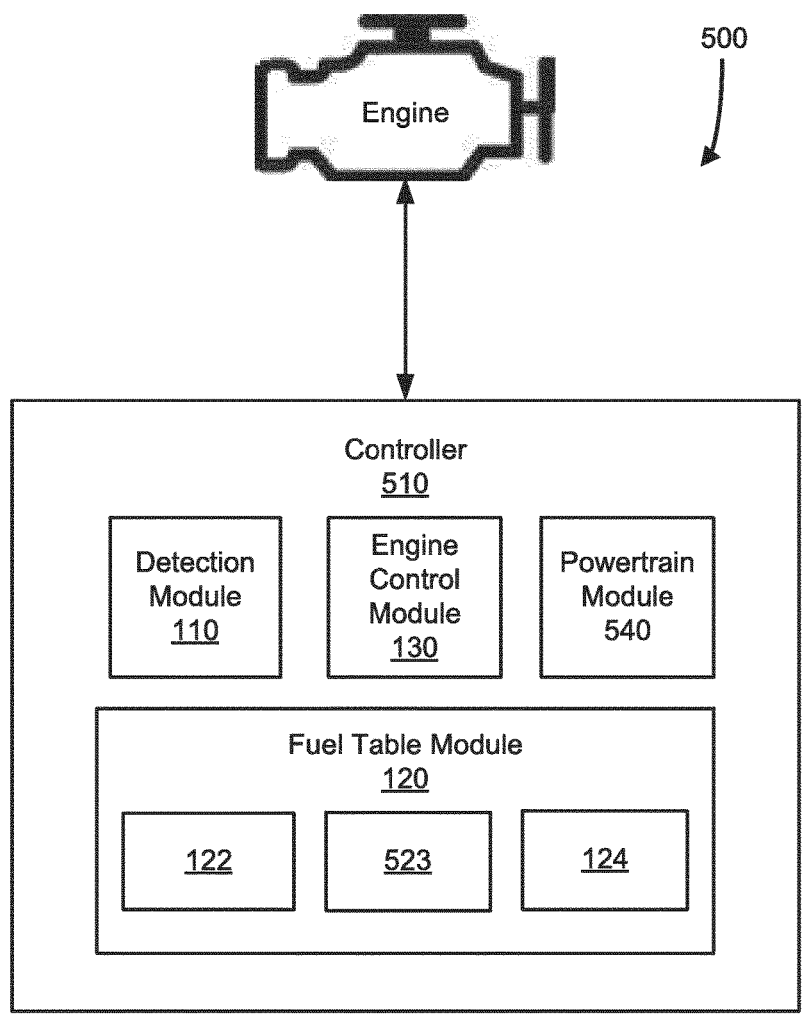
FIG. 5 is a schematic block diagram of another system for controlling a dual fuel engine, according to one representative embodiment.

FIG. 5 is a schematic block diagram of another engine system 500 with a controller 510 for controlling a dual fuel engine, according to another representative embodiment. In the depicted embodiment, the controller 510 includes a detection module 110, a fuel table module 120 (with a first fuel table 122, a second fuel table 523, and a dual fuel table 124), an engine control module 130, and a powertrain module 540. The controller 510 of FIG. 5 includes the same modules from the controller 100 in FIG. 1 plus an additional fuel table 523 in the fuel table module 120 and an additional module, the powertrain module 540.

The second fuel table 523, as briefly mentioned above, may be included in implementations where the substitution rate can reach 100%. In other words, a second fuel table 523 may be included in the system 500 when it is possible to configure the engine to operate with 100% first fuel, 100% second fuel, or a mixture of both fuels (dual fuel mode). In such an embodiment, the detection module 110 can detect which mode the engine is operating in, the fuel table module 120 can select the engine operating request 322 from the appropriate fuel table 122, 523, 124, and the engine control module 130 can implement the changes to the appropriate engine control elements 434. Thus, even if the first fuel were to be depleted, the system 500 could detect such an event and switch the engine environment to operate completely on the second fuel. In some implementations, the substitution rate can reach nearly 100%. For example, for a spark-ignited engine, nearly all the fuel can be gaseous fuel, with a small portion of diesel fuel used as a micro pilot, which may replace the spark plug functionality of the engine.

The powertrain module 540 may include powertrain control elements (other than the engine). For example, in one embodiment where an automobile engine is used, components in the transmission, drive shaft, and differentials may be altered to implement changes to the load on the engine. The powertrain module 540, according to one embodiment, allows the ECM of the engine to change and alter these powertrain control elements depending on the fuel mode in which the engine is operating. For example, if an automobile engine is operating in a first fuel mode, the transmission may benefit from certain gear ratios that differ from the gear ratios of the automobile engine when it is operating in a second fuel mode or in a dual fuel mode.

Figure 6:
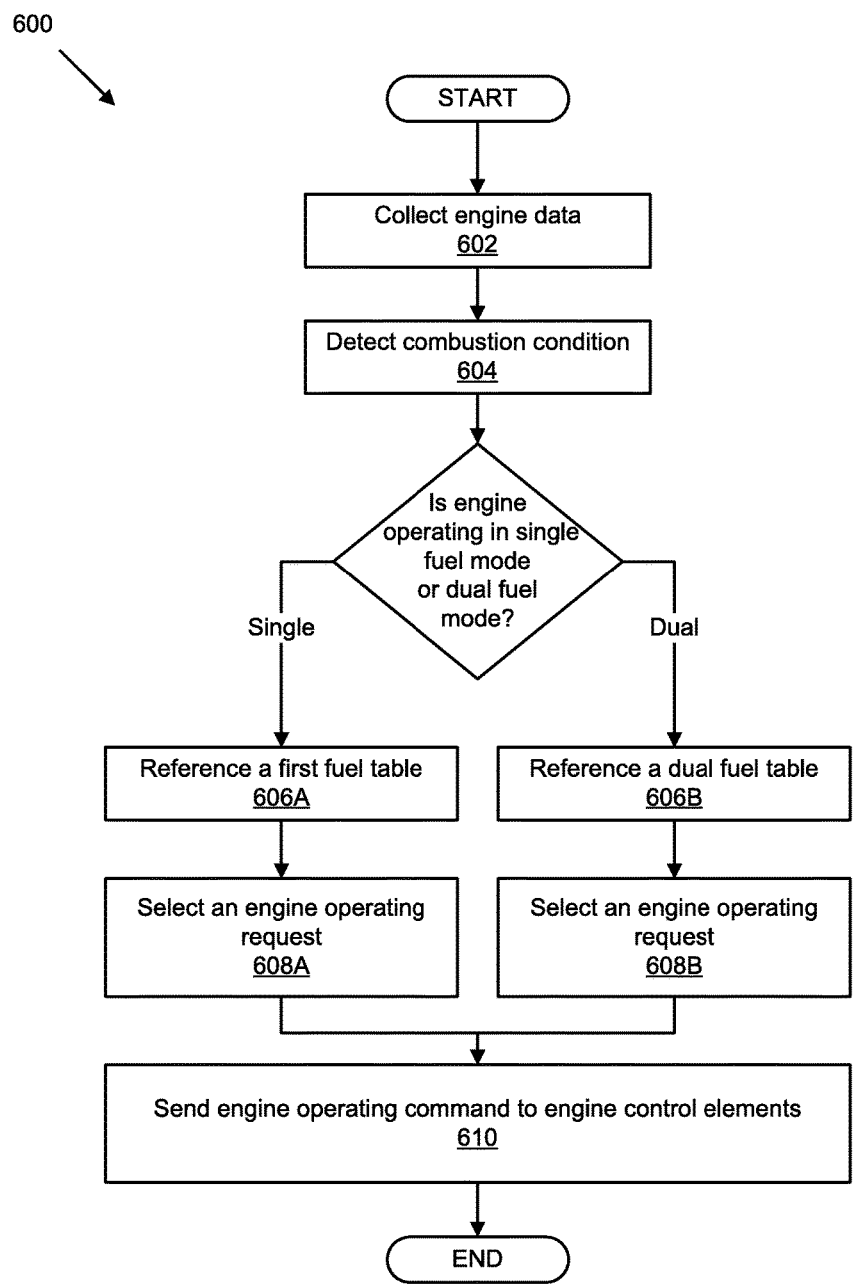
FIG. 6 is a schematic flow chart diagram of a method for controlling a dual fuel engine, according to one representative embodiment.

FIG. 6 is a schematic flow chart diagram of a method 600 for controlling a dual fuel engine, according to one representative embodiment. The method 600 first includes collecting 602 engine data 214 from sensor elements 212. As described above, this may include collecting temperature and pressure readings from temperature and pressure sensors, respectively. Once the data has been collected, the method 600 includes detecting 604 a combustion condition 216 for the engine data 214. This combustion condition 216 includes the status of the engine as either running in a first fuel mode or a dual fuel mode. If the engine is operating in a first (single) fuel mode, the method 600 includes referencing 606A a first fuel table 122 and selecting 608A the appropriate (based on the combustion condition 216) engine operating request 322. If the engine is operating in a dual fuel mode, the method 600 includes referencing 606B a dual fuel table 124 and selecting 608B the appropriate (based on the combustion condition 216) engine operating request 322. Once the engine operating request 322 has been selected, the method 600 includes sending 610 engine operating commands 432 to engine control elements 434 according to the engine operating request 322.

Reference throughout this specification to "one embodiment," "an embodiment," or similar language means that a particular feature, structure, or characteristic described in connection with the embodiment is included in at least one embodiment of the subject matter of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the subject matter of the present disclosure, however, absent an express correlation to indicate otherwise, an implementation may be associated with one or more embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The subject matter of the present disclosure may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system for managing combustion in an internal combustion engine, comprising:
   a detection module that determines a combustion condition of the internal combustion engine, the combustion condition comprising one of a first combustion condition or second combustion condition;
   a fuel table module that receives the combustion condition and selects an engine operating request based on data in a first fuel table when the combustion condition is the first combustion condition, and data in a second fuel table when the combustion condition is the second combustion condition; and
   an engine control module that receives the engine operating request and generates an engine operating command based on the engine operating request;
   wherein the engine control module is structured to delay the engine operating command when the detection module determines that the combustion condition of the internal combustion engine has changed from the first combustion condition to the second combustion condition or from the second combustion condition to the first combustion condition.

2. The system of claim 1, wherein the first combustion condition comprises combustion of only a first fuel, and the second combustion condition comprises combustion of a combination of the first fuel and a second fuel.

3. The system of claim 2, wherein the first fuel comprises a liquid fuel and the second fuel comprises a gaseous fuel.

4. The system of claim 2, wherein the second combustion condition comprises a substitution rate of the second fuel.

5. The system of claim 2, wherein the second fuel table is one of a plurality of second fuel tables each associated with a different desired substitution rate of the second fuel.

6. The system of claim 1, wherein the combustion condition comprises one of the first combustion condition, the second combustion condition, and a third combustion condition, the fuel table module being further configured to select the engine operating request based on data in a third fuel table when the combustion condition is the third combustion condition.

7. The system of claim 6, wherein the first combustion condition comprises combustion of only a first fuel, the second combustion condition comprises combustion of a combination of the first fuel and a second fuel, and the third combustion condition comprises combustion of only the second fuel.

8. The system of claim 1, wherein the data in the first fuel table comprises first predetermined data correlation values based on combustion of only a first fuel by the internal combustion engine, and the data in the second fuel table comprises second predetermined data correlation values based on combustion of a combination of the first fuel and a second fuel by the internal combustion engine, the first and second predetermined data correlation values being different.

9. The system of claim 8, wherein the types of data correlations of the first and second predetermined data correlation values are the same.

10. The system of claim 1, further comprising a powertrain module that receives the engine operating request and adjusts powertrain control elements based on the engine operating request.

11. The system of claim 1, wherein the detection module collects engine data from sensor elements, and determines the combustion condition of the engine based on the engine data collected from the sensor elements.

12. A method for managing combustion in an internal combustion engine, comprising:
- selecting a combustion operating condition of the internal combustion engine, the combustion operating condition being one of a single fuel mode or a dual fuel mode;
- referencing one of a first fuel table or a second fuel table based on the selected operating condition, wherein the first fuel table is referenced when the selected operating condition is the single fuel mode and the second fuel table is referenced when the selected operating condition is the dual fuel mode;
- selecting an engine operating request from the referenced first fuel table or second fuel table;
- sending engine operating commands to engine control elements according to the engine operating request; and
- delaying the engine operating commands when the selected operating condition has changed from the single fuel mode to the dual fuel mode or from the dual fuel mode to the single fuel mode.

13. The method of claim 12, wherein each of the first and second fuel tables comprises a plurality of predetermined engine operating requests based on current operating conditions of the internal combustion engine.

14. The method of claim 12, further comprising collecting engine data from sensor elements, and wherein current operating conditions of the internal combustion engine are based on the collected engine data.

15. The method of claim 12, wherein selecting the combustion operation condition of the engine is based on current operating conditions of the internal combustion engine.

16. The method of claim 12, wherein selecting the combustion operation condition of the engine comprises detecting the combustion operating condition of the engine.

17. The method of claim 12, further comprising referencing one of the first fuel table, the second fuel table, or a third fuel table based on the selected operating condition, and wherein the single fuel mode comprises fueling the internal combustion engine using only one of a first and second fuel, and the dual fuel mode comprises fueling the internal combustion engine using a combination of the first and second fuels, and wherein the first fuel table is referenced when the selected operating condition is the single fuel mode with the internal combustion engine being fueled by the first fuel only, and the third fuel table is referenced when the selected operating condition is the single fuel mode with the internal combustion engine being fueled by the second fuel only.

18. The method of claim 12, wherein the first fuel table comprises first predetermined data correlation values based on combustion of only a first fuel by the internal combustion engine, and the second fuel table comprises second predetermined data correlation values based on combustion of a combination of the first fuel and a second fuel by the internal combustion engine, the first and second predetermined data correlation values being different.

19. The method of claim 18, wherein the types of data correlations of the first and second predetermined data correlation values are the same.

20. A system for managing combustion in an engine, comprising:
- a detection module that collects engine data from sensor elements and detects a combustion condition of the engine, the combustion condition comprising at least a status of whether the engine is combusting a first fuel or a combination of the first fuel and a second fuel;
- a fuel table module that receives the combustion condition and selects an engine operating request, the fuel table module comprising:
  - a first fuel table, wherein the first fuel table is referenced when the engine is only combusting the first fuel, and
  - a dual fuel table, wherein the dual fuel table is referenced when the engine is combusting the combination of the first fuel and the second fuel; and
- an engine control module that receives the engine operating request and sends out engine operating commands to engine control elements;
- wherein the engine control module is structured to delay the engine operating commands when the detection module determines that the engine has changed from combusting the first fuel to combusting the combination of the first fuel and the second fuel or from combusting the combination of the first fuel and the second fuel to combusting the first fuel.

\* \* \* \* \*